US009038049B2

(12) United States Patent
Roberts et al.

(10) Patent No.: US 9,038,049 B2
(45) Date of Patent: May 19, 2015

(54) AUTOMATED DISCOVERY OF RESOURCE DEFINITIONS AND RELATIONSHIPS IN A SCRIPTING ENVIRONMENT

(75) Inventors: Jeffrey S. Roberts, North Bend, WA (US); Ishtiyaq Ahmad Sheikh, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 732 days.

(21) Appl. No.: 13/228,902

(22) Filed: Sep. 9, 2011

(65) Prior Publication Data
US 2013/0066621 A1 Mar. 14, 2013

(51) Int. Cl.
 G06F 9/44 (2006.01)
 G06F 9/455 (2006.01)
 G06F 9/445 (2006.01)
(52) U.S. Cl.
 CPC .............. *G06F 9/45512* (2013.01); *G06F 8/65* (2013.01)
(58) Field of Classification Search
 CPC ........................................................ G06F 8/65
 USPC ......................................................... 717/168
 See application file for complete search history.

(56) References Cited

U.S. PATENT DOCUMENTS

| | | | | |
|---|---|---|---|---|
| 5,640,566 | A * | 6/1997 | Victor et al. | 717/113 |
| 7,367,019 | B2 * | 4/2008 | Mak et al. | 717/140 |
| 7,979,245 | B1 | 7/2011 | Bourlatchkov et al. | |
| 8,060,864 | B1 * | 11/2011 | Michelsen | 717/126 |
| 2002/0128998 | A1 | 9/2002 | Kil et al. | |
| 2003/0070161 | A1 * | 4/2003 | Wong et al. | 717/148 |
| 2005/0005261 | A1 * | 1/2005 | Severin | 717/108 |
| 2007/0294237 | A1 | 12/2007 | John et al. | |
| 2009/0313597 | A1 * | 12/2009 | Rathbone et al. | 717/100 |
| 2010/0070448 | A1 | 3/2010 | Omoigui | |
| 2011/0126275 | A1 | 5/2011 | Anderson et al. | |
| 2011/0145005 | A1 | 6/2011 | Cao et al. | |

OTHER PUBLICATIONS

Morin et al., "Scripting Languages", pp. 1-5, 1999.*
Nystrom et al., "Scalable Extensibility via Nested Inheritance", ACM, Oct. 24-28, 2004, pp. 99-115.*

(Continued)

*Primary Examiner* — Wei Zhen
*Assistant Examiner* — Lanny Ung
(74) *Attorney, Agent, or Firm* — Brian Haslam; Mike Allen; Micky Minhas (57) ABSTRACT

Embodiments of the invention use incomplete metadata, automated heuristics, and user input to construct a data model implemented by a set of commands used in a scripting environment. A combination of a static analysis and a runtime analysis of the scripting environment may be used to determine the data model. Commands that enumerate resources are identified. Return types for the commands are discovered either from a definition of the command or by running the command with default parameters. Properties for the return types are identified and key fields are identified for indexing. Relationships between the return types are identified, and additional commands associated with the return types are identified. The return type properties are analyzed to identify updatable return types. A data model of the scripting environment is created from the collected information.

16 Claims, 5 Drawing Sheets

(56) References Cited

OTHER PUBLICATIONS

Hoschek, Wolfgang, "A Data Model and Query Language for Distributed Service Discovery", Retrieved at <<>>, CERN IT Division European Organization for Nuclear Research, Apr. 2002, pp. 1-10.

Jenkins, et al., "Automatic RDF Metadata Generation for Resource Discovery", Retrieved at <<http://medialab.di.unipi.it/web/doc/WWW8C/data/2138/pdf/pd1.pdf>>, Proceedings of the eighth international conference on World Wide Web, The International Journal of Computer and Telecommunications Networking Computer Networks, vol. 31, No. 11-16, 1999, pp. 227-242.

* cited by examiner

FIG. 1

| | COMMAND | RESOURCE |
|---|---|---|
| 103 | GET-HOST | HOST |
| 104 | GET-VM | VIRTUAL MACHINE |
| 105 | SET-VM | VIRTUAL MACHINE |
| 106 | COMMAND (X-Y) | RESOURCE (Y) |
| 107 | GET-PROCESS | PROCESS |
| 108 | GET-ITEM | FILE SYSTEM ITEM |
| | ... | ... |

FIG. 2

| | RESOURCE | RETURN TYPE | SUPPORTED OPERATIONS |
|---|---|---|---|
| 204 | PROCESS | System.Diagnostic.Process | GET |
| 205 | FILE SYSTEM ITEM | System.IO.FileSystemInfo | GET, SET, NEW, REMOVE |
| | ... | ... | ... |

| RETURN TYPE NAME | BASE TYPE NAME | PROPERTIES | | |
|---|---|---|---|---|
| | | PROPERTY NAME | DATA TYPE | UPDATABLE |
| Disk | | Partition | Partition | Y |
| | | Size | ... | ... |
| | | ... | ... | ... |
| Partition | | MachineName | String | N |
| System.Diagnostics.Process | | ID | Integer | N |
| System.IO.FileSystemInfo | | Name | String | N |
| System.IO.DirectoryInfo | System.IO.FileSystemInfo | Creation Date | String | N |
| System.IO.FileInfo | System.IO.FileSystemInfo | Root | String | N |
| | | IsReadOnly | Boolean | Y |
| ... | ... | ... | ... | ... |

AUTOMATED DISCOVERY OF RESOURCE DEFINITIONS AND RELATIONSHIPS IN A SCRIPTING ENVIRONMENT

BACKGROUND

The commands in an interpretive scripting environment typically expose an underlying conceptual data model that includes sets of one or more resource types. Each resource type may have one or more relationships with other resource types. Each command in the scripting environment may implicitly describe a partial view of the data model, but there is no explicit view of the complete model.

As a result, users of a new or unfamiliar scripting language will not understand the relationships among the resources, data types, return types, and supported operations in the scripting language.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention use incomplete metadata, automated heuristics, and user input to construct a data model implemented by a set of commands used in a scripting environment. A combination of a static analysis and a runtime analysis of the scripting environment may be used to determine the data model.

A scripting language typically uses a finite set of commands that follow a <verb>-<noun> format. Embodiments of the invention reflect on the set of commands and analyze the return type and metadata associated with the commands to develop the data model.

Generally, a scripting environment uses a fundamental set of operations defined by specific verbs, such as Create, Read, Update, Delete (CRUD) operations. It will be understood that the CRUD operations represent a generic set of operations on a resource. The scripting environment may use different verbs in its command set for these operations. For example, one scripting environment may use the verbs New, Get, Set, Remove for the CRUD operations. Embodiments of the invention infer the properties of the commands and data types in the scripting environment using both a static analysis of the command metadata and a runtime analysis when the commands are run set to default values.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 3 illustrates Type Table according to one embodiment;

DETAILED DESCRIPTION

Embodiments of the invention infer resource types and properties from command names and from the return types and object instances returned when the commands are executed. Associations between resources and data types are inferred by matching the data types of properties to a previously identified data types. Updatable properties may be inferred by matching the parameters available in an "update" command to the properties of the types returned by the "get" command. A combination of static analysis and runtime heuristics may be used to produce an explicit model out of an implicit model of the scripting environment.

In one embodiment, the invention operates in a reflective scripting environment that allows runtime introspection of data types and object instances. The following tables may be populated based on the commands available in the scripting environment:

a Command Table comprising a list of commands that enumerate some resource;
  a Resource Table comprising a table of resource sets; and
  a Type Table comprising a table of resource types.

Figure 1:
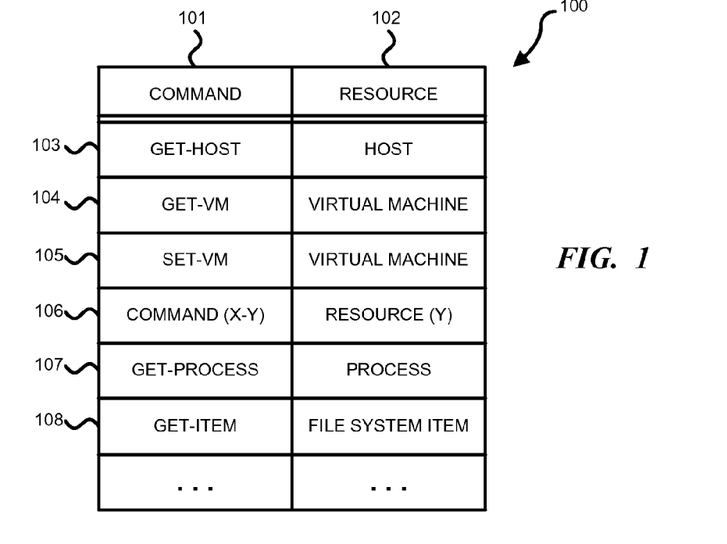
FIG. 1 illustrates a Command Table according to one embodiment.

FIG. 1 illustrates a Command Table 100 according to one embodiment. Each of commands 101 are associated with a resource 102. The commands 101 follow a descriptive <verb>-<noun> naming pattern in which the <verb> is an operation and the <noun> is a resource. For example, the command "GET-HOST" 103 comprises a GET operation denoted by the verb portion and identifies a Host resource in the noun portion. It is expected that multiple commands may correspond to the same resource. For example, commands "GET-VM" 104 and "SET-VM" 105 both correspond to a Virtual Machine (VM) resource. Any number of additional commands "X-Y" 106—using the <verb>-<noun> format— may correspond to operations "X" on resources "Y." The resources "Y" may already be known (i.e. Host, Virtual Machine) or may be new resources.

Figure 2:
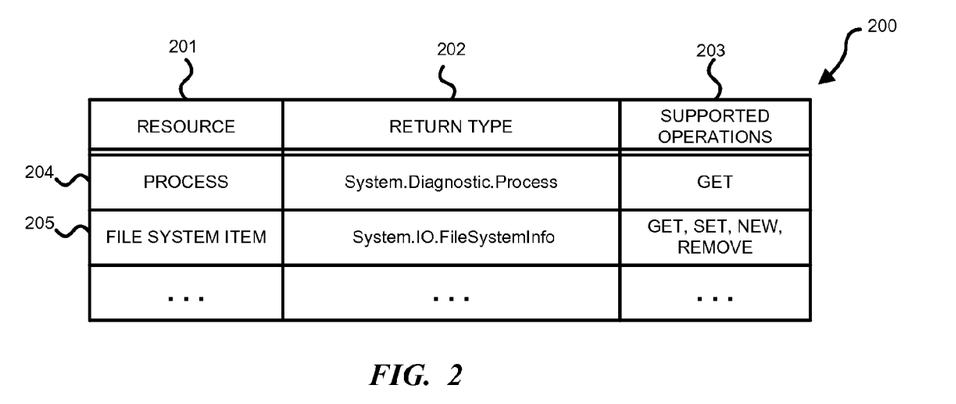
FIG. 2 illustrates a Resource Table according to one embodiment.

FIG. 2 illustrates a Resource Table 200 according to one embodiment. Column 201 lists the resources identified in the scripting environment. Column 202 lists the return types that derive from operations on the resources 201. Column 203 lists supported operations for the data types. In one embodiment, the basic supported operations are selected from the set comprising: Create, Read, Update, and Delete ("CRUD"). In other scripting environments, these same operations may be defined using other <verb> words, such as New, Get, Set, Remove, respectively. Additionally, it will be understood that other operations may also be supported in addition to the CRUD operations.

Return types 202 may be determined by executing operations on the resource and then identifying the resulting return type. Information for other data types is stored in additional rows 205.

FIG. 3 illustrates Type table 300 according to one embodiment. Type Table 300 is a table of return types. Column 301 lists return type names, and the properties 302-305 for each type are also listed. The property information includes, for example, a property name 302, a data type 303, and an indication 304 whether the property can be updated. Additionally, if the return type 301 has a common ancestor or base return type, then that return type is indicated in column 305.

The properties 302-305 of return types 301 may be determined, for example, by analyzing the metadata and fields of the return type data.

The return types may be associated with each other using properties of the return type itself or using keys within the return type. For example, FIG. 3 illustrates two return types labeled "Disk" 306 and "Partition" 307. Using properties of the Disk and Partition, these return types can be automatically associated with each other. The Disk return type has at least two properties (303): "Partition" and "Size." The "Partition" property is of the "Partition" data type (303) and has been determined to be an updatable property (304).

Because the Disk 306 return type includes the Partition property, which corresponds to an already identified Partition 307 return type, it can be inferred that the Disk and Partition return types are related. On further analysis, additional relationships between the Disk and Partition return types may be determined. For example, it may be determined that the Partition return type is always associated with a Disc return type and that the Disk return type may be associated with multiple Partitions.

Other return types may be associated with each other using key fields within the return types. The key field may comprise any field or parameter within the return type. A user may identify certain keys are useful in indexing and/or associating the return types. For example, an identifier field or a path name within a return type may be used as a key, if it provides a unique value within the scripting environment. Using these keys, all return types that include the key can be associated with each other. The keys may be simple, such as a single field or parameter, or complex, such as a combination of two or more parameters.

Resource Table 200 provides a mapping between Command Table 100 and Type Table 300. For example, in Command table 100, the Get-Process command 107 is associated with a Process resource. In Type table 300, the System.Diagnostics.Process 308 return type has been identified and has the properties MachineName, ID, and Name. Resource table 200 links the Process resource and the System.Diagnostics.Process return type in row 204. The Process resource is further identified as supporting the Get operation.

Similarly, Command table 100 identifies the resource File System Item, which is associated with the Get-Item command 108. Row 205 of Return Type table 200 shows that the File System Item resource has been associated with the System.IO.FileSystemInfo return type. The File System Item resource supports the Get, Set, New and Remove operations. The System.IO.FileSystemInfo return type 309 has been identified in Return Type table 300. Accordingly, using Return Type table 200, the File System Item resource (108) can be tied to the System.IO.FileSystemInfo return type (309) and its associated properties.

Return Type table 300 can be used to identify relationships between return types. As noted above, in the discussion regarding the Disk and Partition return types, table 300 shows relationships between return types and the properties of other return types.

The return types can be further analyzed to identify return types that have a base return type or a common ancestor. For example, if the Get-Item command is run against drive, a list of folders and files in the drive are returned with the return type System.IO.FileSystemInfo (309). The System.IO.FileSystemInfo return type may have properties such as Creation Date, which lists the date the folder or file was created. Other return types, such as System.IO.DirectoryInfo (310) and System.IO.FileInfo (311), have also been identified. These return types may be used to provide information specifically about directories or files, respectively. They may also include the Creation Date property to show the date a directory or file was created. However, they may be different in that System.IO.DirectoryInfo may return data regarding files and other directories within the target directory, while System.IO.FileInfo only returns data regarding a file, which cannot include other files or directories. These three return types may be further identified as being derived from a base return type (305), such as the System.IO.FileSystemInfo return type (309).

In one embodiment, the following process may be used to populate tables 100, 200, and 300. Table 100 is populated by identifying the set of commands 101 in a scripting language that implement CRUD operations, such as an enumeration operation. These commands may be identified automatically and may include user input to add or remove commands from the chosen set.

For each command 101, if a single return type is defined by the command's metadata, then a new row 306 is added to Table 300 (FIG. 3) with that type name. For each property in the return type 301, that property to the list of properties 302 in Table 300.

If multiple return types 301 are defined by the command's metadata, then each type 301 is added to Table 300 along with their respective properties 302. The set of return types 301 are examined and common ancestors in the type hierarchy are identified. If a non-trivial common ancestor exists, then a new row is added to Table 200 (FIG. 2) with the common ancestor as its type and with a heterogeneous resource set. Otherwise, a new row is added to Table 200 for each type with a separate resource set for each. These rows in Table 200 may be flagged or highlighted as requiring verification from a human user. Any mandatory parameters of the command that have names matching a property of the type are marked as candidates for key properties. Any optional parameters of the command that have names matching a property of the type are marked as being indexed for efficient filtering in a query.

If no return types are defined in the command's metadata, then the command is executed with all of the command's parameters set to their default values. The output of the command is then captured and analyzed. If the output is empty, or if some parameters cannot be defaulted, then the user may be prompted for the necessary parameters and the command run again. The data type of each captured output object is identified and added to Table 300 as discussed above.

The names of the type properties for each row in Table 200 may be checked against a dictionary of commonly used key names for key properties, such as "ID" or "Name." If any of the type properties match the key names, then those properties are marked as possible key properties.

The data types of the type properties for each row in Table 200 are checked against each other. If the data type matches the type of some other row in Table 200 or is a derived type, then the property is determined to be more than simple structure that is embedded in its parent. It is identified instead as a reference to an instance of the other type.

If the command naming conventions include an explicit <verb> name, or the system explicitly maps commands to a <verb>-<noun> model, then the algorithm can augment the resource set with a list of supported operations. Each resource property may be marked as either read-only or read/write.

For each row in Table 200, the name of the matching "Get" script command is fetched. The algorithm looks for matching commands that update, create, or delete instances, by replacing the "Get" verb in the command with common command <verbs> such as "Delete," "Remove," and so forth. When a matching command is found, the list of supported set operations in Table 200 is updated with that information. If a matching "Update" command is found, then the algorithm checks for command parameters that match the name of properties in the set type. Any matching properties are marked as being writable properties, and all other properties are marked read-only.

The model generated above and as represented by Tables 100, 200, and 300 may be presented to a user for validation and correction.

Figure 4:
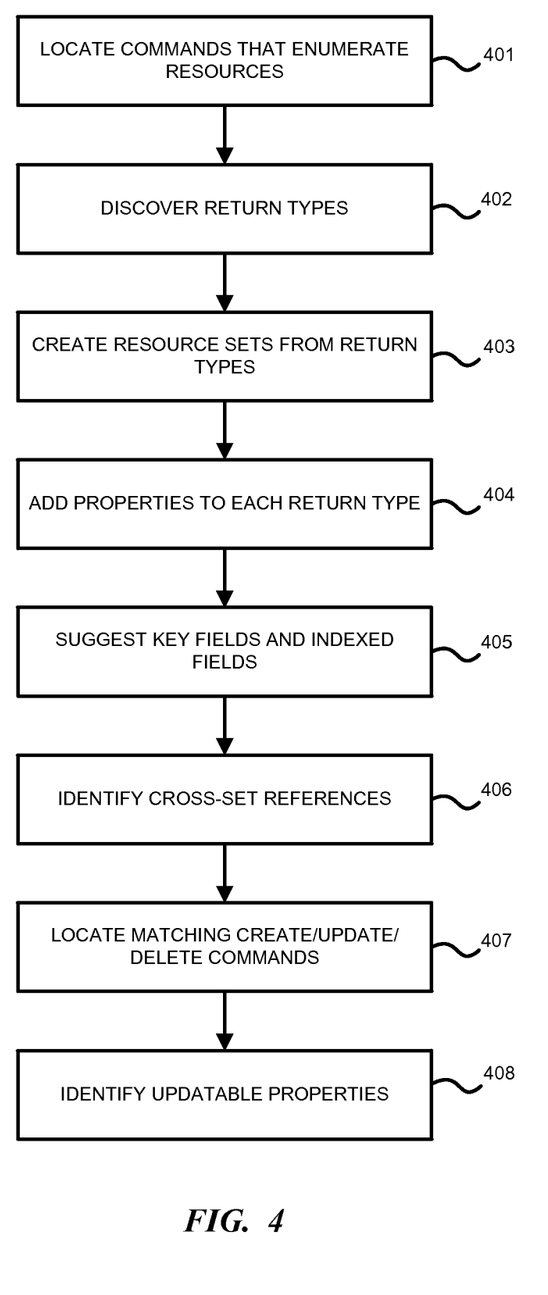
FIG. 4 is a flowchart illustrating a process according to one embodiment.

FIG. 4 is a flowchart illustrating a process according to one embodiment. In step 401, a script language is analyzed and commands that enumerate resources are located. For example, commands that are associated with resources, such as CRUD operations or commands having other <verb> names, are identified. The commands identified in step 401 may be a subset of the module or set of commands for the scripting environment.

In step 402, the return types for each of the commands are identified. In one embodiment, the return type may be determined using a static analysis by reflecting on the metadata of the command. In other embodiments, an active or runtime analysis is required, wherein the command is executed using default parameters and the return data types for the command identified. For example, a GET command may be executed and the data returned for the command is captured. The returned value may be assumed to be a resource.

Using the return types from step 402, resource sets are created in step 403, wherein the resource sets comprise instances of the return types.

In step 404, properties are added to each return type. These properties may include details such as field names, for example. The properties are analyzed in step 405 to identify key fields, indexed fields or other unique identifiers.

In step 406, the cross-set references are identified by analyzing the properties of the data types that have been identified. Relationships among the data types may be identified by properties in one data type that act as pointers to the related data types.

In step 407, related commands are identified. The related commands may be identified using the naming convention of the scripting language, for example. In one embodiment, in a small number of verbs in the scripting language may be associated with basic commands such as create, read, update, and delete. Additional related commands may be use the key properties and return types.

In step 408, updatable properties are identified. The algorithm may identify commands that may be modified or that have writable properties as updatable commands. For example, the parameters of commands that are used for updates may be matched with the names of properties of the resources that are updated.

Figure 5:
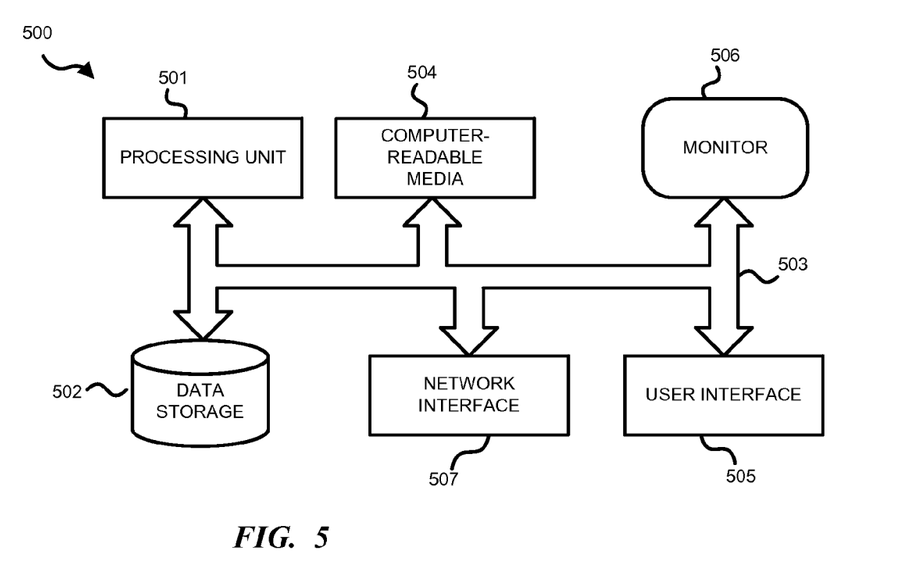
FIG. 5 illustrates an example of a suitable computing and networking environment on which the examples of FIGS. 1-4 may be implemented.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 500. Components may include, but are not limited to, processing unit 501, data storage 502, such as a system memory, and system bus 503 that couples various system components including the data storage 502 to the processing unit 501. The system bus 503 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically includes a variety of computer-readable media 504. Computer-readable media 504 may be any available media that can be accessed by the computer 501 and includes both volatile and nonvolatile media, and removable and non-removable media. By way of example, and not limitation, computer-readable media 504 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The data storage or system memory 502 includes computer storage media in the form of volatile and/or nonvolatile memory such as read only memory (ROM) and random access memory (RAM). A basic input/output system (BIOS), containing the basic routines that help to transfer information between elements within computer 500, such as during startup, is typically stored in ROM. RAM typically contains data and/or program modules that are immediately accessible to and/or presently being operated on by processing unit 501. By way of example, and not limitation, data storage 502 holds an operating system, application programs, and other program modules and program data.

Data storage 502 may also include other removable/non-removable, volatile/nonvolatile computer storage media. By way of example only, data storage 502 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 505 or other input devices such as a tablet, electronic digitizer, a microphone, keyboard, and/or pointing device, commonly referred to as mouse, trackball or touch pad. Other input devices may include a joystick, game pad, satellite dish, scanner, or the like. These and other input devices are often connected to the processing unit 501 through a user input interface 505 that is coupled to the system bus 503, but may be connected by other interface and bus structures, such as a parallel port, game port or a universal serial bus (USB). A monitor 506 or other type of display device is also connected to the system bus 503 via an interface, such as a video interface. The monitor 506 may also be integrated with a touch-screen panel or the like. Note that the monitor and/or touch screen panel can be physically coupled to a housing in which the computing device 500 is incorporated, such as in a tablet-type personal computer. In addition, computers such as the computing device 500 may also include other peripheral output devices such as speakers and printer, which may be connected through an output peripheral interface or the like.

The computer 500 may operate in a networked environment using logical connections 507 to one or more remote computers, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a LAN networking environment, the computer 500 may be connected to a LAN through a network interface or adapter 507. When used in a WAN networking environment, the computer 500 typically includes a modem or other means for establishing communications over the WAN, such as the Internet. The modem, which may be internal or external, may be connected to the system bus 503 via the network interface 507 or other appropriate mechanism. A wireless networking component such as comprising an interface and antenna may be coupled through a suitable device such as an access point or peer computer to a WAN or LAN. In a networked environment, program modules depicted relative to the computer 500, or portions thereof, may be stored in the remote memory storage device. It may be appreciated that the network connections shown are exemplary and other means of establishing a communications link between the computers may be used.

Figure 6:
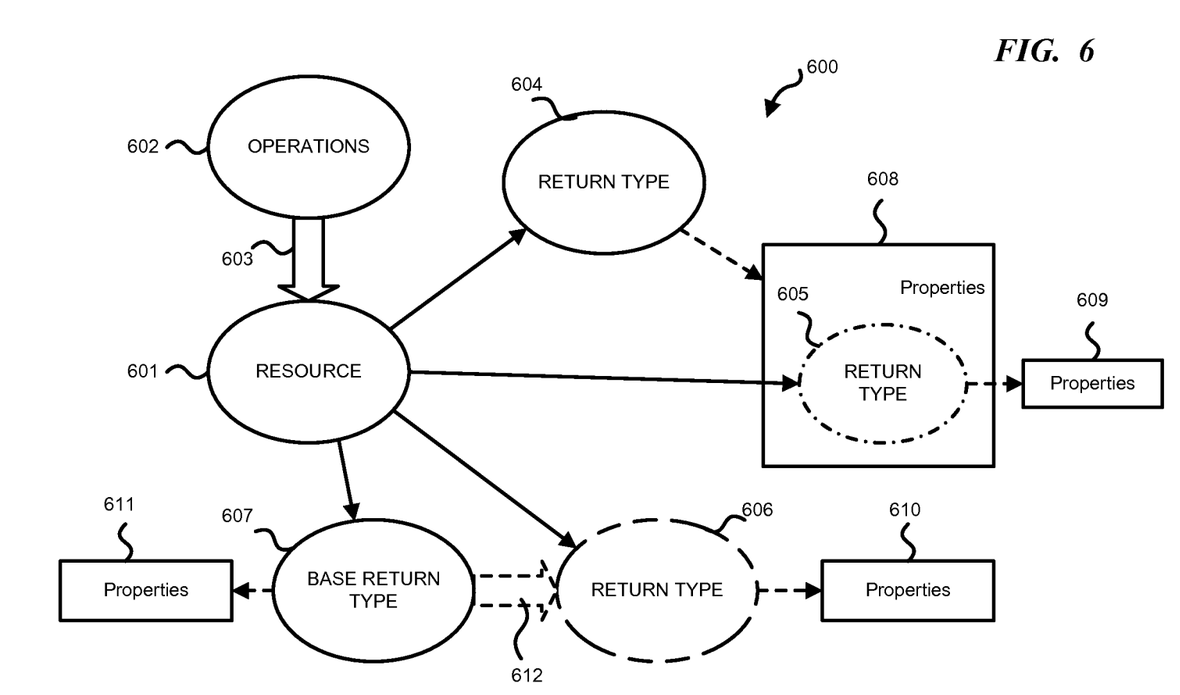
FIG. 6 illustrates an example display created to visually represent relationships among resources, commands and return types.

In one embodiment, the information collected in tables 100, 200, and 300 as described above may be used to generate a visual display that illustrates the relationship among resources, commands, operations, return types and properties. For example, FIG. 6 illustrates an example display 600 created to visually represent relationships among resources, commands and return types.

Display 600 illustrates the relationships for a selected resource 601. A set of one or more operations 602 that operate on the resource are also shown. Commands 603 that are associated with the resource 601 may also be shown. The relationship between the resources 601, operations 602, and commands 603 may be determined, for example, from table 100 or any other source. A number of return types 604-607 that are associated with the resource are also shown. The relationship between the resources 601 and the return types 604-607 may be determined, for example, from table 200 or any other source. Ovals are shown as representing the resource 601, operations 602, and return types 604-0607. It will be understood that any other shape, icon or graphic may be used to represent these items and that each item may have the same or a unique shape. Additionally, the shape of the item may include information such as a name or other parameter.

Each return type 604-607 is linked to a set of properties 608-611. These properties may be determined, for example, from table 300 or any other source. The properties are shown as boxes. It will be understood that any other shape, icon or graphic may be used to represent these resources. Additionally, the figure that represents the properties may include information such as a name, data type, updateable status, base return type, or any other property parameter.

The relationships among the return types 604-607 may be further illustrated graphically in display 600. For example, as described above in connection with the Disk and Partition return types, certain return types (Partition) may appear as properties of other return types (Disk). This may be represented visually in one embodiment by showing return type 605 as part of the properties 608 of return type 604. The embedded return type 605 may be further highlighted by using a different icon, font, shape, or color than the other return types.

Certain return types may derive from other return types. As illustrated above, the System.IO.FileSystemInfo return type may serve as a base return type for the System.IO.DirectoryInfo and System.IO.FileInfo return type, so that the System.IO.DirectoryInfo and System.IO.FileInfo return types share a common ancestor. This may be represented visually in display 600 by showing that return type 606 derives (612) from return type 607. The derived return type 605 (or the base return type 607) may be further highlighted by using a different icon, font, shape, or color than the other return types.

FIG. 6 illustrates a single resource 601 merely to simplify the display 600 for purposes of discussion. It will be understood that additional resources may also be added to display 600. These additional resources may be associated with some, all, or none of the existing return types 604-607 and operations 602. The additional resources may also be associated with additional return types and operations to be added to the display 600.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    performing, by one or more computer systems:
        identifying commands within a scripting environment that enumerate resources;
        executing the commands using default parameters to determine return types;
        determining properties for each return type;
        identifying key fields among the return type properties;
        indexing the return type properties using the key fields to identify related return types;
        searching for a matching update command; and
        upon locating the matching update command, checking for parameters that match properties of the update command's return type, marking a matching property of the update command's return type as writable, and marking a non-matching property of the update command's return type as read-only.

2. The method of claim 1, further comprising:
    identifying updatable properties in the return types.

3. The method of claim 1, further comprising:
    analyzing metadata for commands to determine the return types.

4. The method of claim 1, further comprising:
    identifying one or more return types having an ancestor return type.

5. The method of claim 1, further comprising:
    identifying a return type that acts as a base return type for other return types.

6. The method of claim 1, further comprising:
    identifying an association between two return types by determining that a property in a first return type has a data type corresponding to a second return type.

7. The method of claim 1, further comprising:
    identifying an association between two return types by determining that a property within a first return type corresponds to a key within a second return type.

8. The method of claim 1, further comprising:
    generating a diagram graphically illustrating relationships among resources, commands, and data types.

9. A computer system, comprising:
    one or more processors; and
    a memory coupled to the one or more processors, the memory having stored thereon computer-executable instructions that, upon execution by the one or more processors, causes the computer system to:
        identify a set of commands from a scripting environment module that enumerate resources;
        execute the commands using default parameters to determine return types;
        identify properties of one or more return types;
        identify key fields among the return type properties;
        index the return type properties using the key fields to identify related return types;
        search for a matching update command; and
        upon locating the matching update command, check for parameters that match properties of the update command's return type, mark a matching property of the update command's return type as writable, and mark a non-matching property of the update command's return type as read-only.

10. The computer system of claim 9, wherein the computer-executable instructions, upon execution by the one or more processors, further cause the computer system to:
    determine, based upon each command's metadata, one or more return types for each command.

11. The computer system of claim 9, wherein the computer-executable instructions, upon execution by the one or more processors, further cause the computer system to:
    identify updatable properties within the return types.

12. A computer-readable storage memory comprising instructions that, when executed by a computer system, cause the computer system to:
    identify commands within a scripting environment that enumerate resources;
    execute the commands using default parameters to determine return types;
    determine properties for each return type;
    identify key fields among the return type properties;
    index the return type properties using the key fields to identify related return types;
    search for a matching update command;
    and upon locating the matching update command, check for parameters that match properties of the update command's return type, mark a matching property of the update command's return type as writable, and mark a non-matching property of the update command's return type as read-only.

13. The computer-readable storage memory of claim 12, wherein the instructions further cause the computer system to:
    identify one or more return types having an ancestor return type.

14. The computer-readable storage memory of claim 12, wherein the instructions further cause the computer system to:
    identify a return type that acts as a base return type for other return types.

15. The computer-readable storage memory of claim 12, wherein the instructions further cause the computer system to:
    identify an association between two return types by determining that a property in a first return type has a data type corresponding to a second return type.

16. The computer-readable storage memory of claim 12, wherein the instructions further cause the computer system to:
    generate diagram graphically illustrating relationships among resources, commands, and data types.

* * * * *